(12) United States Patent
Spottiswoode et al.

(10) Patent No.: US 8,295,471 B2
(45) Date of Patent: Oct. 23, 2012

(54) SELECTIVE MAPPING OF CALLERS IN A CALL-CENTER ROUTING SYSTEM BASED ON INDIVIDUAL AGENT SETTINGS

(75) Inventors: S. James P. Spottiswoode, Beverly Hills, CA (US); Qiaobing Xie, Chesterfield, MO (US); Zia Chishti, Washington, DC (US)

(73) Assignee: The Resource Group International, Hamilton (BM)

( * ) Notice: Subject to any disclaimer, the term of this patent is extended or adjusted under 35 U.S.C. 154(b) by 749 days.

(21) Appl. No.: 12/355,618

(22) Filed: Jan. 16, 2009

(65) Prior Publication Data

US 2010/0183138 A1   Jul. 22, 2010

(51) Int. Cl.
  *H04M 3/523* (2006.01)
(52) U.S. Cl. ......... 379/265.11; 379/265.06; 379/265.12; 379/266.01
(58) Field of Classification Search ............. 379/265.01, 379/265.02, 265.06, 266.01, 625.11–625.14
  See application file for complete search history.

(56) References Cited

U.S. PATENT DOCUMENTS

| | | |
|---|---|---|
| 6,859,529 B2 | 2/2005 | Duncan et al. |
| 6,956,941 B1 | 10/2005 | Duncan et al. |
| 6,978,006 B1 | 12/2005 | Polcyn |
| 7,023,979 B1 | 4/2006 | Wu et al. |
| 7,050,566 B2 | 5/2006 | Becerra et al. |
| 7,062,031 B2 | 6/2006 | Becerra et al. |
| 7,209,549 B2 | 4/2007 | Reynolds et al. |
| 7,231,032 B2 | 6/2007 | Nevman et al. |
| 7,236,584 B2 | 6/2007 | Torba |
| 7,593,521 B2 | 9/2009 | Becerra et al. |
| 2002/0082736 A1 | 6/2002 | Lech et al. |
| 2002/0161765 A1 | 10/2002 | Kundrot et al. |
| 2003/0169870 A1 | 9/2003 | Stanford |
| 2004/0101127 A1 | 5/2004 | Dezonno et al. |
| 2005/0043986 A1 | 2/2005 | McConnell et al. |

(Continued)

FOREIGN PATENT DOCUMENTS

EP   0 493 292 A2   7/1992

(Continued)

OTHER PUBLICATIONS

Anonymous. (2006). "Performance Based Routing in Profit Call Centers," *The Decision Makers' Direct*, located at www.decisioncraft.com , Issue Dec. 6, 2001, three pages.

(Continued)

*Primary Examiner* — Harry Hong
(74) *Attorney, Agent, or Firm* — Morrison & Foerster LLP

(57) ABSTRACT

Systems and methods are disclosed for routing callers to agents in a contact center, along with an intelligent routing system. An exemplary method includes mapping a first portion of callers to agents according to a performance and/or pattern matching algorithm based on comparing caller data associated with the callers and agent data associated with the agents and mapping a second portion of the callers (e.g., the remaining portion callers) to agents differently than the first portion of the callers (e.g., mapping based on queue order), which may provide a control group for monitoring or analyzing the effect and/or training of the pattern matching algorithm. The first and second portion may be varied separately for each agent within the contact center. The method may further include displaying the effect of the routing on at least one outcome variable, which may include revenue generation, cost, customer satisfaction, first call resolution, cancellation, or other variable outputs from the pattern matching algorithm of the system.

44 Claims, 8 Drawing Sheets

U.S. PATENT DOCUMENTS

| | | | |
|---|---|---|---|
| 2006/0222164 | A1 | 10/2006 | Contractor et al. |
| 2009/0190740 | A1 | 7/2009 | Chishti et al. |
| 2009/0190743 | A1 | 7/2009 | Spottiswoode |
| 2009/0190744 | A1 | 7/2009 | Xie et al. |
| 2009/0190745 | A1 | 7/2009 | Xie et al. |
| 2009/0190746 | A1 | 7/2009 | Chishti et al. |
| 2009/0190747 | A1 | 7/2009 | Spottiswoode |
| 2009/0190748 | A1 | 7/2009 | Chishti et al. |
| 2009/0190749 | A1 | 7/2009 | Xie et al. |
| 2009/0190750 | A1 | 7/2009 | Xie et al. |
| 2009/0323921 | A1 | 12/2009 | Spottiswoode et al. |
| 2010/0020959 | A1 | 1/2010 | Spottiswoode |
| 2010/0020961 | A1 | 1/2010 | Spottiswoode |
| 2010/0054452 | A1 | 3/2010 | Afzal |
| 2010/0054453 | A1 | 3/2010 | Stewart |
| 2011/0022357 | A1* | 1/2011 | Vock et al. .......... 702/182 |

FOREIGN PATENT DOCUMENTS

| | | |
|---|---|---|
| EP | 0 949 793 A1 | 10/1999 |
| EP | 1 032 188 A1 | 8/2000 |
| WO | WO-01/63894 A2 | 8/2001 |
| WO | WO-01/63894 A3 | 8/2001 |
| WO | WO-2006/124113 A2 | 11/2006 |

OTHER PUBLICATIONS

Gans, N. et al. (2003). "Telephone Call Centers: Tutorial, Review and Research Prospects," *Manufacturing & Service Operations Management*, pp. 1-81.

International Search Report mailed on Mar. 13, 2009, for PCT Application No. PCT/US2008/077042, filed on Sep. 19, 2008, 6 pages.

International Search Report mailed on Jun. 3, 2009, for PCT Application No. PCT/US2009/031611, filed on Jan. 21, 2009, 8 pages.

International Search Report mailed on Feb. 24, 2010, for PCT Application No. PCT/US2009/066254, filed on Dec. 1, 2009, 4 pages.

International Search Report mailed on Mar. 12, 2010, for PCT Application No. PCT/US2009/054352, filed on Aug. 19, 2009, 5 pages.

Koole, G. (2004). "Performance Analysis and Optimization in Customer Contact Centers," Proceedings of the Quantitative Evaluation of Systems, *First International Conference*, Sep. 27-30, 2004, four pages.

Koole, G. et al. (Mar. 6, 2006). "An Overview of Routing and Staffing Algorithms in Multi-Skill Customer Contact Centers," Manuscript, 42 pages.

Riedmiller, M. et al. (1993). "A Direct Adaptive Method for Faster Backpropagation Learning: The RPROP Algorithm," *1993 IEEE International Conference on Neural Networks*, San Francisco, CA, Mar. 28-Apr. 1, 1993, 1:586-591.

Written Opinion mailed on Mar. 13, 2009, for PCT Application No. PCT/US2008/077042, filed on Sep. 19, 2008, 6 pages.

Written Opinion mailed on Jun. 3, 2009, for PCT Application No. PCT/US2009/031611, filed on Jan. 21, 2009, 8 pages.

Written Opinion mailed on Feb. 24, 2010, for PCT Application No. PCT/US2009/066254, filed on Dec. 1, 2009, 6 pages.

Written Opinion mailed on Mar. 12, 2010, for PCT Application No. PCT/US2009/054352, filed on Aug. 19, 2009. 6 pages.

\* cited by examiner

SELECTIVE MAPPING OF CALLERS IN A CALL-CENTER ROUTING SYSTEM BASED ON INDIVIDUAL AGENT SETTINGS

CROSS REFERENCE TO RELATED APPLICATIONS

This application is related to U.S. patent applications Ser. No. 12/021,251, filed Jan. 28, 2008, and Ser. No. 12/266,446, filed on Nov. 6, 2008, both of which are hereby incorporated by reference in their entirety.

BACKGROUND

1. Field

The present invention relates generally to the field of routing phone calls and other telecommunications in a contact center system.

2. Related Art

The typical contact center consists of a number of human agents, with each assigned to a telecommunication device, such as a phone or a computer for conducting email or Internet chat sessions, that is connected to a central switch. Using these devices, the agents are generally used to provide sales, customer service, or technical support to the customers or prospective customers of a contact center or a contact center's clients.

Typically, a contact center or client will advertise to its customers, prospective customers, or other third parties a number of different contact numbers or addresses for a particular service, such as for billing questions or for technical support. The customers, prospective customers, or third parties seeking a particular service will then use this contact information, and the incoming caller will be routed at one or more routing points to a human agent at a contact center who can provide the appropriate service. Contact centers that respond to such incoming contacts are typically referred to as "inbound contact centers."

Similarly, a contact center can make outgoing contacts to current or prospective customers or third parties. Such contacts may be made to encourage sales of a product, provide technical support or billing information, survey consumer preferences, or to assist in collecting debts. Contact centers that make such outgoing contacts are referred to as "outbound contact centers."

In both inbound contact centers and outbound contact centers, the individuals (such as customers, prospective customers, survey participants, or other third parties) that interact with contact center agents using a telecommunication device are referred to in this application as a "caller." The individuals acquired by the contact center to interact with callers are referred to in this application as an "agent."

Conventionally, a contact center operation includes a switch system that connects callers to agents. In an inbound contact center, these switches route incoming callers to a particular agent in a contact center, or, if multiple contact centers are deployed, to a particular contact center for further routing. In an outbound contact center employing telephone devices, dialers are typically employed in addition to a switch system. The dialer is used to automatically dial a phone number from a list of phone numbers, and to determine whether a live caller has been reached from the phone number called (as opposed to obtaining no answer, a busy signal, an error message, or an answering machine). When the dialer obtains a live caller, the switch system routes the caller to a particular agent in the contact center.

Routing technologies have accordingly been developed to optimize the caller experience. For example, U.S. Pat. No. 7,236,584 describes a telephone system for equalizing caller waiting times across multiple telephone switches, regardless of the general variations in performance that may exist among those switches. Contact routing in an inbound contact center, however, is a process that is generally structured to connect callers to agents that have been idle for the longest period of time. In the case of an inbound caller where only one agent may be available, that agent is generally selected for the caller without further analysis. In another example, if there are eight agents at a contact center, and seven are occupied with contacts, the switch will generally route the inbound caller to the one agent that is available. If all eight agents are occupied with contacts, the switch will typically put the contact on hold and then route it to the next agent that becomes available. More generally, the contact center will set up a queue of incoming callers and preferentially route the longest-waiting callers to the agents that become available over time. Such a pattern of routing contacts to either the first available agent or the longest-waiting agent is referred to as "round-robin" contact routing. In round robin contact routing, eventual matches and connections between a caller and an agent are essentially random.

Some attempts have been made to improve upon these standard yet essentially random processes for connecting a caller to an agent. For example, U.S. Pat. No. 7,209,549 describes a telephone routing system wherein an incoming caller's language preference is collected and used to route their telephone call to a particular contact center or agent that can provide service in that language. In this manner, language preference is the primary driver of matching and connecting a caller to an agent, although once such a preference has been made, callers are almost always routed in "round-robin" fashion.

BRIEF SUMMARY

Systems and methods of the present invention can be used to improve or optimize the routing of callers to agents in a contact center. According to one aspect, a method for routing callers to agents in a call-center routing system includes mapping a first portion or fraction of callers to agents based on agent performance data and/or a pattern matching algorithm. The percentage of callers that are routed based on a performance based and/or pattern matching algorithm is referred to generally herein as the "power" of the mapping system. The size of the first portion or fraction is adjustable for individual agents; for example, the power may be tailored and adjusted for each agent within the contact center. The method further includes mapping a second portion or fraction of the callers to agents differently than the first portion of callers. For example, the second portion of callers may be mapped to agents based on a random process such as an Automatic Call Distribution (ACD) queue order or according to a performance based order of the agents, where the second portion of callers may serve as a control group or benchmark to assist in accessing the performance of the performance and/or pattern matching algorithms for mapping the first portion of callers to agents.

In one example, the method further includes causing the display of a graphical element for adjusting the number or fraction of callers for a first portion of callers that are mapped via performance and/or pattern matching algorithms. The method may further include causing the display of a graphical element for adjusting the number or fraction of callers for a second portion of callers that are mapped differently than the first portion of callers. The size of the first portion may be adjustable for individual agents. The method may further display the estimated effect of the power or a change thereto on one or more outcome variables of the performance and/or pattern matching algorithms for mapping the callers.

According to another aspect, an interface is provided for use with an inbound or outbound call routing center for routing callers based on performance of agents and/or pattern matching algorithms between callers and agents. In one example, the interface includes a graphical element (e.g., a selector, slider, text field, or the like) for setting and adjusting the portion or number of callers for a first portion of callers that are routed based on the performance of agents and/or pattern matching algorithms. The interface may further include a graphical element for setting and adjusting the portion or number of callers for a second portion of callers that are routed based on a random or conventional routing method (e.g., based on queue order of the agents and/or callers). For instance, the graphical element allows a contact center operator the ability to route a first portion or fraction of the callers to agents via a pattern matching algorithm and route the remaining callers by a different process, e.g., based on queue order or the like. Such a system and method may allow for a control group of caller-agent pairs to be connected for comparing and analyzing the effects of routing based on the pattern matching algorithm.

In one example, an interface is provided to set the power for individual agents as well as globally. The interface may include a graphical user element for adjusting the power for individual agents. The interface may further include a graphical user element for selecting individual agents to adjust the power therefore. The interface may also include a graphical user element for selecting a global threshold for limiting the power. The interface may include a graphical user element for selecting thresholds for the power for individual agents.

In one example the interface is further operable to display an estimated effect of the power associated with a particular agent on at least one outcome variable. For instance, the interface operates to display estimated revenue generation, cost, customer satisfaction, first call resolution, cancellation, or other outcome variables of the performance and/or pattern matching algorithm(s) based on a particular setting of the power assigned to a particular agent. The outcome variables may be estimated based on past call history data, stored algorithms, look-up tables, or the like. Further, the interface may be operable to display an estimated change in the at least one outcome variable if the selection of the power is changed.

According to another aspect, apparatus is provided comprising logic for mapping and routing callers to agents. The apparatus may include logic for mapping a first portion (or fraction) of callers to agents according to a pattern matching algorithm based on comparing caller data associated with the callers and agent data associated with the agents, wherein the size of the first portion is adjustable for individual agents. The apparatus may further include mapping a second portion of the callers (e.g., the remaining portion or fraction of all callers) to agents differently than the first portion of the callers (e.g., mapping based on queue order, a random process, or based on performance alone), which may provide a control group for monitoring or analyzing the effect of the pattern matching algorithm. Further, the apparatus may operate to cause the display of a graphical element with an interface for adjusting the portion or number of callers routed or mapped via a performance and/or pattern matching algorithm.

Many of the techniques described here may be implemented in hardware, firmware, software, or combinations thereof. In one example, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

DETAILED DESCRIPTION OF THE INVENTION

Figure 1:
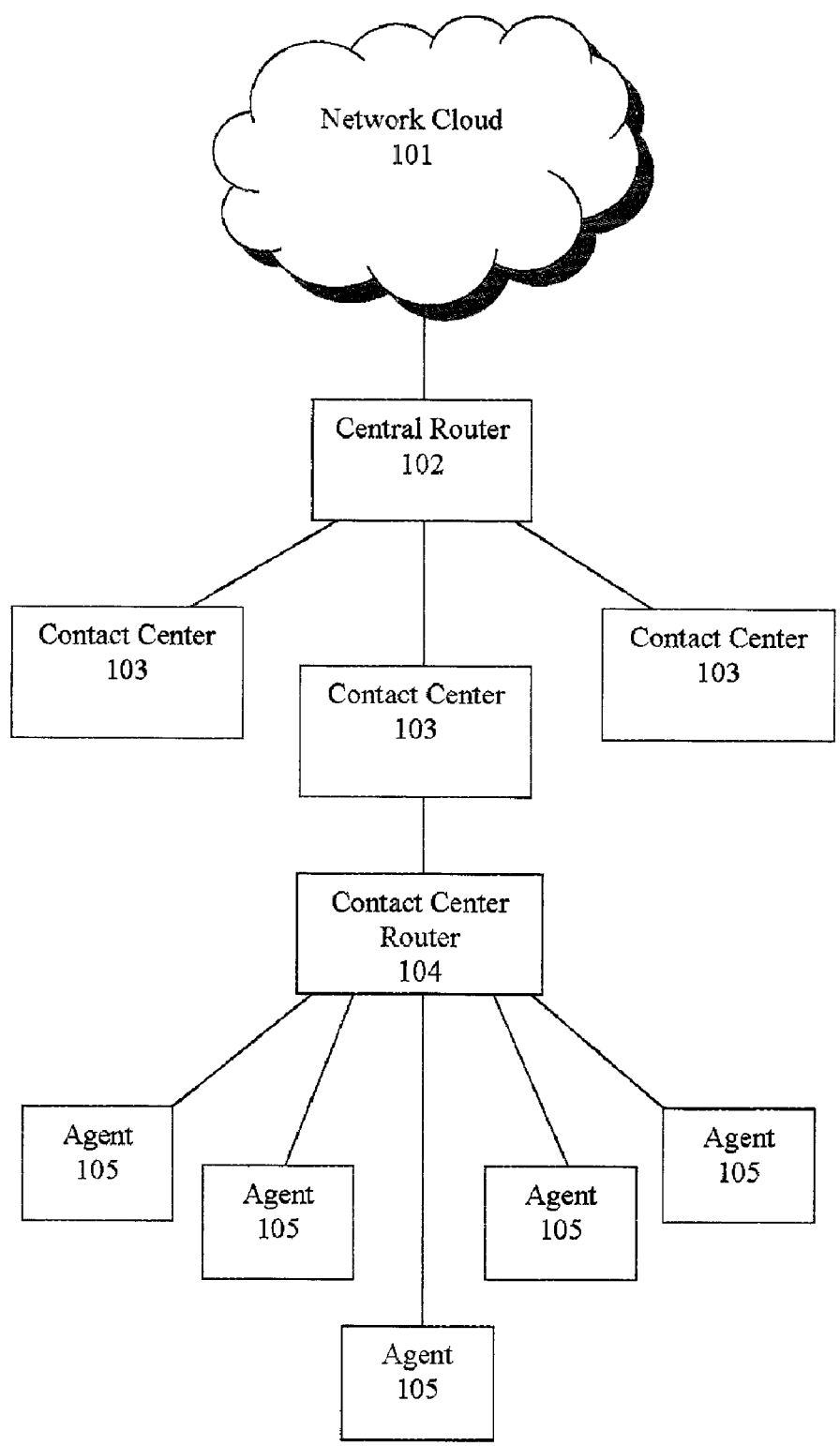
FIG. 1 is a diagram reflecting the general setup of a contact center operation.

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

According to one aspect of the present invention systems, methods, and displayed computer interfaces are provided for selectively routing a first portion of callers to agents within a call-center based on performance and/or pattern matching algorithms and routing a second portion of callers to agents based on a different method (e.g., queue based routing or the like). The systems, methods, and interfaces further include allowing a user to set and change the number or fraction of callers that are mapped based on performance and/or pattern matching algorithms. Routing a portion of the calls by conventional queue based routing may provide information regarding the effectiveness and performance of applied performance and/or pattern matching algorithms on desired outcomes of the call-center.

Initially, exemplary call routing systems and methods utilizing performance and/or pattern matching algorithms (either of which may be used within generated computer models for predicting the changes of desired outcomes) are described for routing callers to available agents. This description is followed by exemplary interfaces and methods for setting and adjusting the number of callers routed based on performance and/or pattern matching algorithms as well as displaying results of the performance and/or pattern matching algorithms on one or more outcome variables.

FIG. 1 is a diagram reflecting the general setup of a contact center operation 100. The network cloud 101 reflects a specific or regional telecommunications network designed to receive incoming callers or to support contacts made to outgoing callers. The network cloud 101 can comprise a single contact address, such as a telephone number or email address, or multiple contract addresses. The central router 102 reflects contact routing hardware and software designed to help route contacts among call-centers 103. The central router 102 may not be needed where there is only a single contact center deployed. Where multiple contact centers are deployed, more routers may be needed to route contacts to another router for a specific contact center 103. At the contact center level 103, a contact center router 104 will route a contact to an agent 105 with an individual telephone or other telecommunications equipment 105. Typically, there are multiple agents 105 at a contact center 103.

Figure 2:
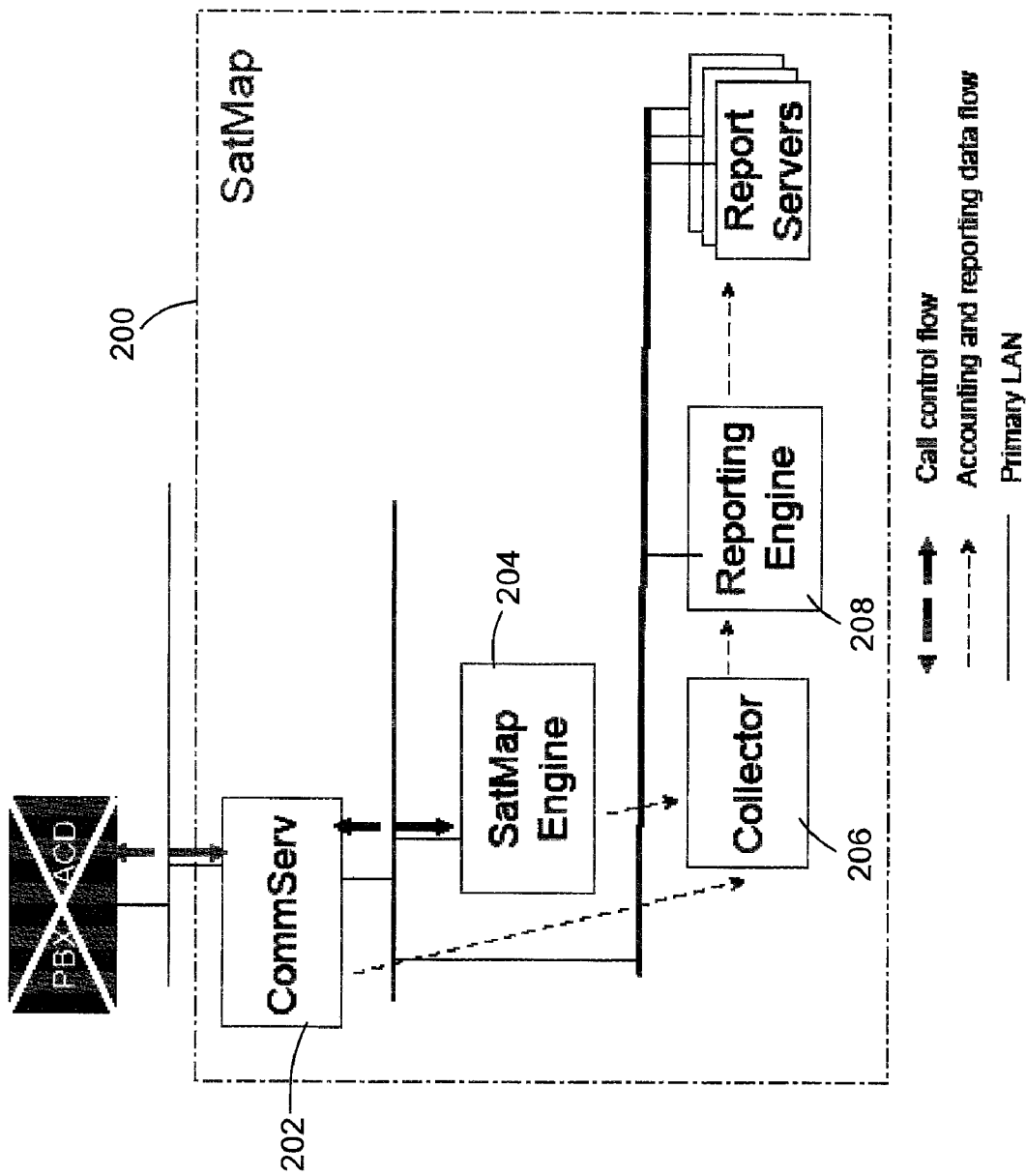
FIG. 2 illustrates an exemplary routing system having a routing engine for routing callers based on performance and/or pattern matching algorithms.

FIG. 2 illustrates an exemplary contact center routing system 200 (which may be included with contact center router 104 of FIG. 1). Broadly speaking, routing system 200 is operable to match callers and agents based, at least in part, on agent performance or pattern matching algorithms using caller data and/or agent data. Routing system 200 may include a communication server 202 and a routing engine 204 (referred to at times as "SatMap" or "Satisfaction Mapping") for receiving and matching callers to agents (referred to at times as "mapping" callers to agents).

Routing engine 204 may operate in various manners to match callers to agents based on performance data of agents, pattern matching algorithms, and computer models, which may adapt over time based on the performance or outcomes of previous caller-agent matches. In one example, the routing engine 204 includes a neural network based adaptive pattern matching engine. Various other exemplary pattern matching and computer model systems and methods which may be included with content routing system and/or routing engine 204 are described, for example, in U.S. patent application Ser. No. 12/021,251, filed Jan. 28, 2008, and U.S. patent application Ser. No. 12/202,091, filed Aug. 29, 2008, both of which are hereby incorporated by reference in their entirety. Of course, it will be recognized that other performance based or pattern matching algorithms and methods may be used alone or in combination with those described here.

Routing system 200 may further include other components such as collector 206 for collecting caller data of incoming callers, data regarding caller-agent pairs, outcomes of caller-agent pairs, agent data of agents, and the like. Further, routing system 200 may include a reporting engine 208 for generating reports of performance and operation of routing system 200. Various other servers, components, and functionality are possible for inclusion with routing system 200. Further, although shown as a single hardware device, it will be appreciated that various components may be located remotely from each other (e.g., communication server 202 and routing engine 204 need not be included with a common hardware/server system or included at a common location). Additionally, various other components and functionality may be included with routing system 200, but have been omitted here for clarity.

Figure 3:
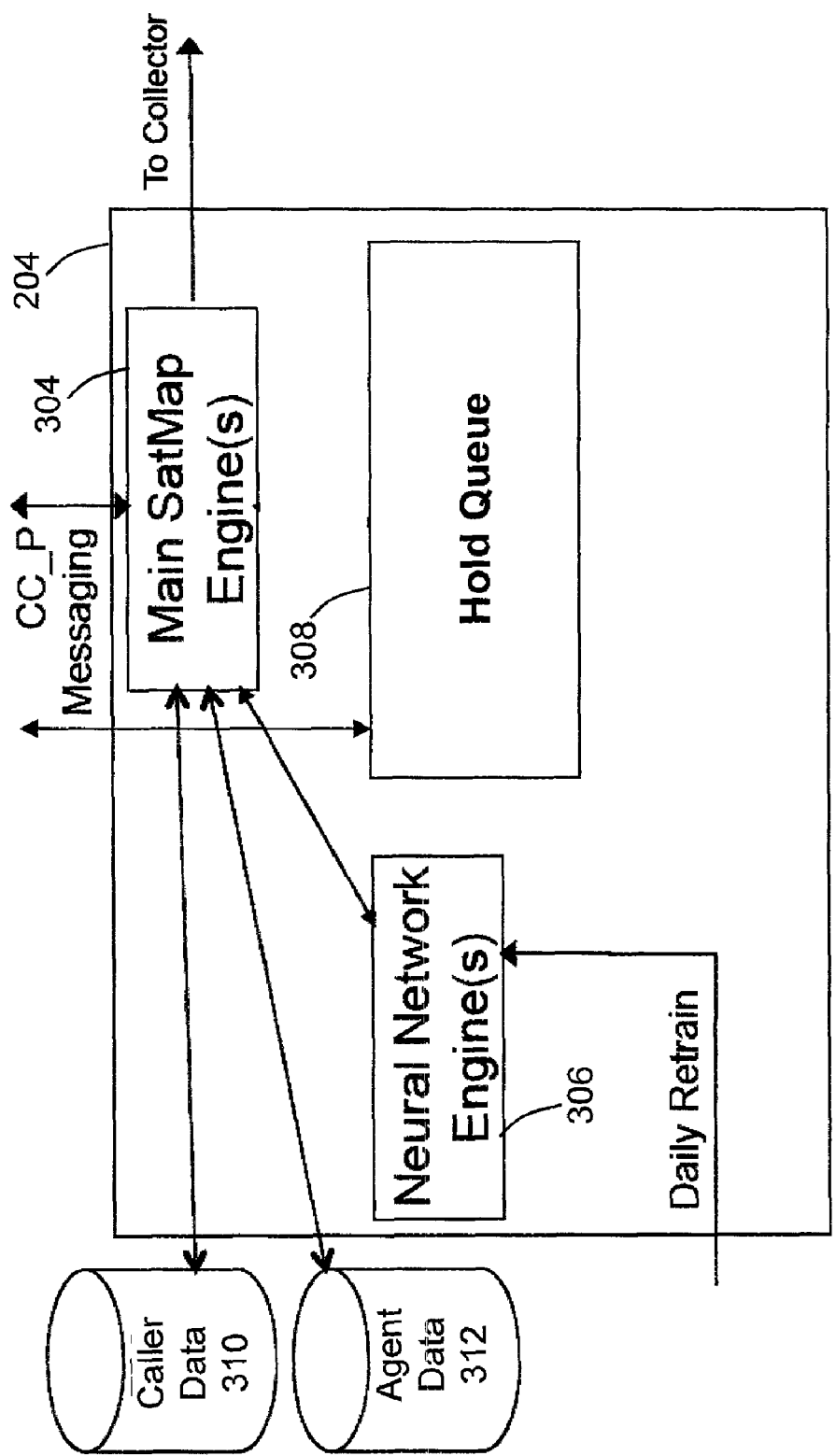
FIG. 3 illustrates an exemplary routing system having a mapping engine for routing callers based on performance and/or pattern matching algorithms.

FIG. 3 illustrates detail of exemplary routing engine 204. Routing engine 204 includes a main mapping engine 304, which receives caller data and agent data from databases 310 and 312. In some examples, routing engine 204 may route callers based solely or in part on performance data associated with agents. In other examples, routing engine 204 may make routing decisions based solely or in part on comparing various caller data and agent data, which may include, e.g., performance based data, demographic data, psychographic data, and other business-relevant data. Additionally, affinity databases (not shown) may be used and such information received by routing engine 204 for making routing decisions.

In one example, routing engine 204 includes or is in communication with one or more neural network engines 306. Neural network engines 306 may receive caller and agent data directly or via routing engine 204 and operate to match and route callers based on pattern matching algorithms and computer models generated to increase the changes of desired outcomes. Further, as indicated in FIG. 3, call history data (including, e.g., caller-agent pair outcomes with respect to cost, revenue, customer satisfaction, etc.) may be used to retrain or modify the neural network engine 306.

Routing engine 204 further includes or is in communication with hold queue 308, which may store or access hold or idle times of callers and agents, and operate to map callers to agents based on queue order of the callers (and/or agents). Mapping engine 304 may operate, for example, to map callers based on a pattern matching algorithm, e.g., as included with neural network engine 306, or based on queue order, e.g., as retrieved from hold queue 308. In particular, mapping engine 304 mapping a first portion of callers based on one or more of performance based data, pattern matching algorithm(s), or computer model(s). Additionally, mapping engine 304 may route a second portion of callers based on a queue order of the callers, preferentially routing those callers that have been held the longest (a similar queue and preferentially routing may be used if multiple agents are available for a caller). It should be noted that other essentially random routing methods may be used in place of queue routing, and which generally serve as a control for comparing with the performance and/or pattern matching mapping methods described.

The percentage of callers that are routed based on a performance based and/or pattern matching algorithm is called the "power" of the mapping system. The power of the mapping system may be set globally. For example, when the power is set globally at 80%, for every 8 callers that are routed based on a performance-based and/or pattern matching algorithm, there are 2 callers that are routed based on an essentially random routing method. The power may also be set for individual agents. For example, the power may be set at 80% for one set of agents but only 60% for a second set of agents.

Figure 4:
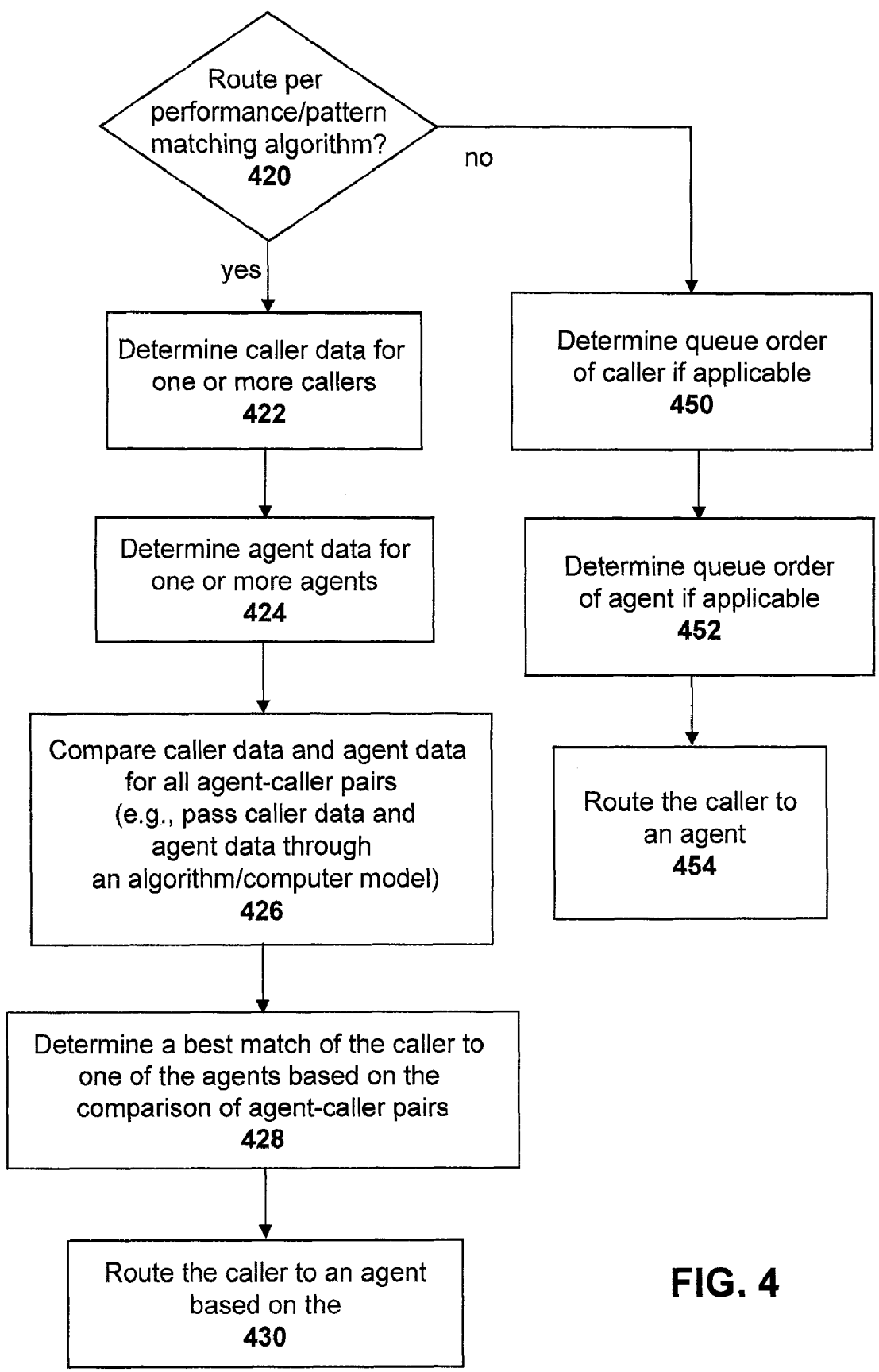
FIG. 4 illustrates an exemplary method for matching a first portion of callers and agents using caller data and agent data in a pattern matching algorithm and a second portion of callers using queue order.

FIG. 4 illustrates an exemplary method for mapping and routing callers to agents where a first portion or fraction of callers is routed based on a performance based and/or pattern matching algorithm and a second portion or fraction of callers is routed based on conventional, essentially random, routing method such as queue based routing. In this example, the power of the mapping system is set globally. Accordingly, a routing system first determines how the caller is to be routed at 420. For instance, the system may map callers and agents in various ratios depending on the settings input by the contact center. For example, if the setting is at 80, or 80%, the system would map 80% of the caller-agent pairs based on performance and/or pattern matching algorithms and the remaining 20% of caller-agent pairs based on other methods such as queue order.

Exemplary performance based and/or pattern matching methods for routing callers to agents includes rating agents on performance, comparing agent data and caller data and matching per a pattern matching algorithm, creating computer models to predict outcomes of agent-caller pairs, or combinations thereof. In particular, one exemplary method for increasing the chances of an optimal interaction includes combining agent grades (which may be determined from grading or ranking agents on desired outcomes), agent demographic data, agent psychographic data, and other business-relevant data about the agent (individually or collectively referred to in this application as "agent data"), along with demographic, psychographic, and other business-relevant data about callers (individually or collectively referred to in this application as "caller data"). Agent and caller demographic data can comprise any of: gender, race, age, education, accent, income, nationality, ethnicity, area code, zip code, marital status, job status, credit score, and the like. Agent and caller psychographic data can comprise any of introversion, sociability, desire for financial success, film and television preferences, and the like.

The exemplary method may include determining caller data associated with one or more callers (e.g., a caller on hold), determining agent data associated with one or more agents (e.g., one or more available agents), comparing the agent data and the caller data (e.g., via a pattern matching algorithm), and matching the caller to an agent to increase the chance of an optimal interaction. In particular, at 422, caller data (such as a caller demographic or psychographic data) is determined or identified for a caller. One way of accomplishing this is by retrieving caller data from available databases by using the caller's contact information as an index. Available databases include, but are not limited to, those that are publicly available, those that are commercially available, or those created by a contact center or a contact center client. In an outbound contact center environment, the caller's contact information is generally known beforehand. In an inbound contact center environment, the caller's contact information can be retrieved by examining the caller's CallerID information or by requesting this information of the caller at the outset of the contact, such as through entry of a caller account number or other caller-identifying information. Other business-relevant data such as historic purchase behavior, current level of satisfaction as a customer, or volunteered level of interest in a product may also be retrieved from available databases.

At 424, agent data for one or more agents is identified or determined. One method of determining agent demographic or psychographic data can involve surveying agents at the time of their employment or periodically throughout their employment. Such a survey process can be manual, such as through a paper or oral survey, or automated with the survey being conducted over a computer system, such as by deployment over a web-browser. In some examples, the method uses agent grades, demographic, psychographic, and other business-relevant data, along with caller demographic, psychographic, and other business-relevant data, other embodiments of the exemplary methods and systems can eliminate one or more types or categories of caller or agent data to reduce the time to answer, computing power, or storage necessary.

The agent data and caller data may then be compared at 426. For instance, the agent data and caller data can be passed to a computational system for comparing caller data to agent data for each agent-caller pair, e.g., the caller data and agent data is compared in a pair-wise fashion for each potential routing decision. In one example, the comparison is achieved by passing the agent and caller data to a pattern matching algorithm to create a computer model that matches each caller with each agent and estimates the probable outcome of each matching along a number of optimal interactions, such as the generation of a sale, the duration of contact, or the likelihood of generating an interaction that a customer finds satisfying.

Exemplary pattern matching algorithms can include any correlation algorithm, such as a neural network algorithm or a genetic algorithm. In one example, a resilient backpropagation (RProp) algorithm may be used, as described by M. Riedmiller, H. Braun: "A Direct Adaptive Method for Faster backpropagation Learning: The RPROP Algorithm," Proc. of the IEEE Intl. Conf. on Neural Networks 1993, which is incorporated by reference herein in its entirety. To generally train or otherwise refine the algorithm, actual contact results (as measured for an optimal interaction) are compared against the actual agent and caller data for each contact that occurred. The pattern matching algorithm can then learn, or improve its learning of, how matching certain callers with certain agents will change the chance of an optimal interaction. In this manner, the pattern matching algorithm can then be used to predict the chance of an optimal interaction in the context of matching a caller with a particular set of caller data, with an agent of a particular set of agent data. Preferably, the pattern matching algorithm is periodically refined as more actual data on caller interactions becomes available to it, such as periodically training the algorithm every night after a contact center has finished operating for the day.

The pattern matching algorithm may create or use a computer model reflecting the predicted chances of an optimal interaction for each agent and caller matching. Preferably, the computer model will comprise the predicted chances for a set of optimal interactions for every agent that is logged in to the contact center as matched against every available caller. Alternatively, the computer model can comprise subsets of these, or sets containing the aforementioned sets. For example, instead of matching every agent logged into the contact center with every available caller, examples can match every available agent with every available caller, or even a narrower subset of agents or callers. Likewise, the present invention can match every agent that ever worked on a particular campaign—whether available or logged in or not—with every available caller. Similarly, the computer model can comprise predicted chances for one optimal interaction or a number of optimal interactions.

A computer model can also comprise a suitability score for each matching of an agent and a caller. The suitability score can be determined by taking the chances of a set of optimal interactions as predicted by the pattern matching algorithm, and weighting those chances to place more or less emphasis on a particular optimal interaction as related to another optimal interaction. The suitability score can then be used in the exemplary methods and systems to determine which agents should be connected to which callers.

Based on the pattern matching algorithm and/or computer model, the method further includes determining the agent having the best match to the caller at 428. As will be understood, the best matching agent may depend on the pattern matching algorithm, computer model, and desired output variables and weightings selected by a particular call-center. The caller is then routed to the best matching agent at 430.

If the caller is selected at 420 for mapping to an agent by a different method (e.g., not based on a performance and/or pattern matching algorithm), this particular exemplary method includes routing via an Automatic Call Distribution (ACD) queue order or the like by determining a queue order of the caller, if applicable, at 450. For example, if other callers are on hold waiting for an available agent, the caller may be queued with other callers, e.g., a system may order the callers in terms of hold time and preferentially map those callers that have been holding the longest. Similarly, the exemplary method includes determining a queue order of the agents, if applicable, at 452 (for example, in a situation where multiple agents are available). Accordingly, the system generally operates to map the agent that has been waiting or idle the longest with the caller that has been holding the longest. The caller may then be routed to the agent at 454.

It is noted that in other examples, where callers are matched with at least a pattern matching algorithm (e.g., alone or in combination with performance based ranking of the agents), the different method may include performance based routing. This allows for comparing or benchmarking the pattern matching algorithm against performance based routing.

According to another aspect of the exemplary systems and methods described, a visual computer interface and printable reports may be provided to the contact center or their clients to allow them to, in a real-time or a past performance basis, monitor the statistics of agent to caller matches, measure the optimal interactions that are being achieved versus the interactions predicted by the computer model, as well as any other measurements of real time or past performance using the methods described herein. A visual computer interface for changing the number or portion of callers that are mapped via performance and/or pattern matching algorithms (as well as the weighting on an optimal interaction) can also be provided to the contact center or the contact center client, such that they can, as discussed herein, monitor the effect of the performance based data and/or pattern matching algorithms on one or more outcome variables.

Figure 5:
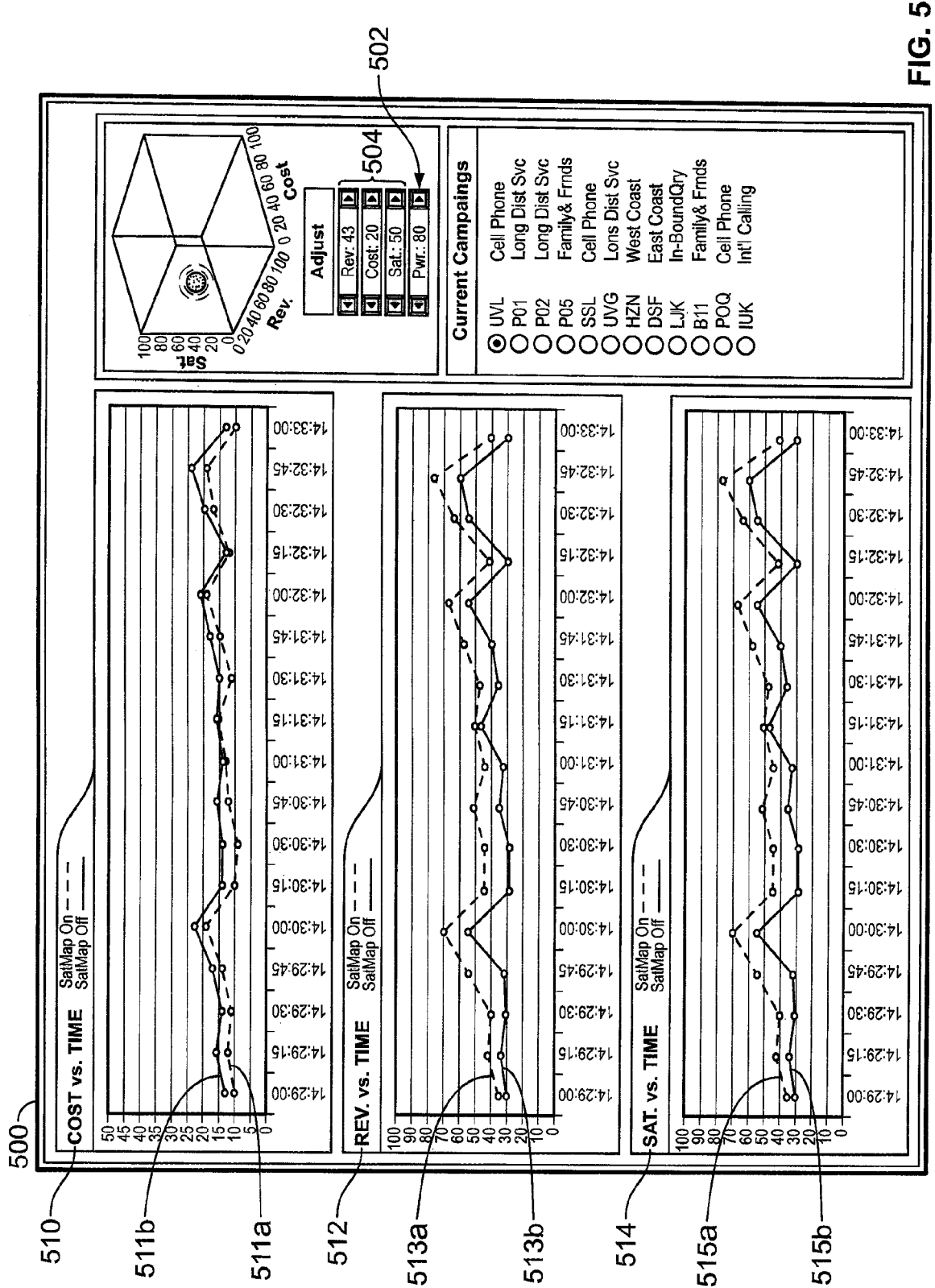
FIG. 5 illustrates an exemplary GUI (Graphical User Interface) having a graphic element for adjusting the number or fraction of callers for routing based on performance and/or pattern matching algorithms.

FIG. 5 illustrates an exemplary interface 500 having a graphic element 502 for adjusting the fraction or portion of callers that are mapped according to performance and/or pattern matching algorithms. In this example, the power of the mapping system may be set globally. It will be recognized that interface 500 may be displayed within a browser page, portal page, or standalone user interface for a contact center routing system. Additionally, various other information and functionality may be included with interface 500, but is omitted here for clarity.

In this example, interface 500 displays a report of call-center performance broken down by different output variables at 510, 512, and 514. In particular, cost, revenue generation, and customer satisfaction are illustrated, but other output variables such as first call resolution, cancellation, or other variable outputs from the pattern matching algorithm(s) or computer model(s) of the system may be displayed. Interface 500 further includes settings for desired weightings of different outcome variables of the pattern matching algorithms and computer models being used for routing callers to agents at 504. In particular, selector 504 includes selectors for adjusting the weighting of revenue, cost, and customer satisfaction in the call-center routing algorithms and computer models. Various weighting methods and algorithms are described, for example, in copending U.S. patent application Ser. No. 12/202,091, filed Aug. 29, 2008, which is incorporated herein by reference in its entirety. Of course, various other pattern matching algorithms, computer models, and weighting methods for adjusting the desired outcomes are possible and contemplated.

As described, selector 502 operates to adjust the "power" of the mapping system, e.g., the portion or percentage of callers that are mapped via performance and/or pattern matching algorithms as described. In this example, if selector 502 is set to "100" the system routes all callers via the performance and/or pattern matching algorithms; alternatively, if selector 502 is set to "0" the system does not route any callers via the performance and/or pattern matching algorithms. Selector 502 may be adjusted in response to input from a mouse, input to a key board (e.g., arrow keys, numerical entries, and so on), or the like. Further, selector 502 may be replaced or further include a "slider" element, drop-down selector, entry field for manually entering numbers or values, up-and-down arrows, and so on.

As described, routing a fraction of callers by an essentially random process provides an evaluation of the performance and/or pattern matching algorithms of the mapping system. For example, outcome variables can be compared for callers routed via the mapping system and those routed otherwise. For instance, interface 500 includes a display 510 of cost over time for the routing system with the mapping system on and off (i.e., "SatMap On" and "SatMap Off") as indicated by 511a and 511b respectively. Display 510 illustrates that the cost is lower for callers routed via the mapping system than those mapped differently (e.g., by queue order or essentially randomly). As indicated in display 512, revenue for callers routed via the mapping system, shown by 513a, is greater than for other callers, shown by 513b. Further, as indicated in display 514, customer satisfaction for callers routed via the mapping system, shown by 515a, is greater than for other callers, shown by 515b.

It is noted that the information displayed by displays 510, 512, and 514 are of past performance data; however, in other examples, interface 500 may further operate to display estimated effects on one or more outcome variables by changing selector 502. For instance, displaying the probable change in one or more of cost, revenue generation, or customer satisfaction by changing selector 502. Various estimation methods and algorithms for estimating outcome variables are described, for example, in copending U.S. provisional Patent application Ser. No. 61/084,201, filed on Jul. 28, 2008, and which is incorporated herein by reference in its entirety. In one example, the estimate includes evaluating a past time period of the same (or similar) set of agents and constructing a distribution of agent/caller pairs. Using each pair, an expected success rate can be computed via the pattern matching algorithm and applied to current information to estimate current performance (e.g., with respect to one or more of sales, cost, customer satisfaction, etc.). Accordingly, taking historical call data and agent information the algorithm can compute estimates of changing the power or number of callers mapped via the performance and/or pattern matching algorithms. It is noted that a comparable time (e.g., time of day, day of the week etc.) for the historical information may be important as performance will likely vary with time.

Figure 6:
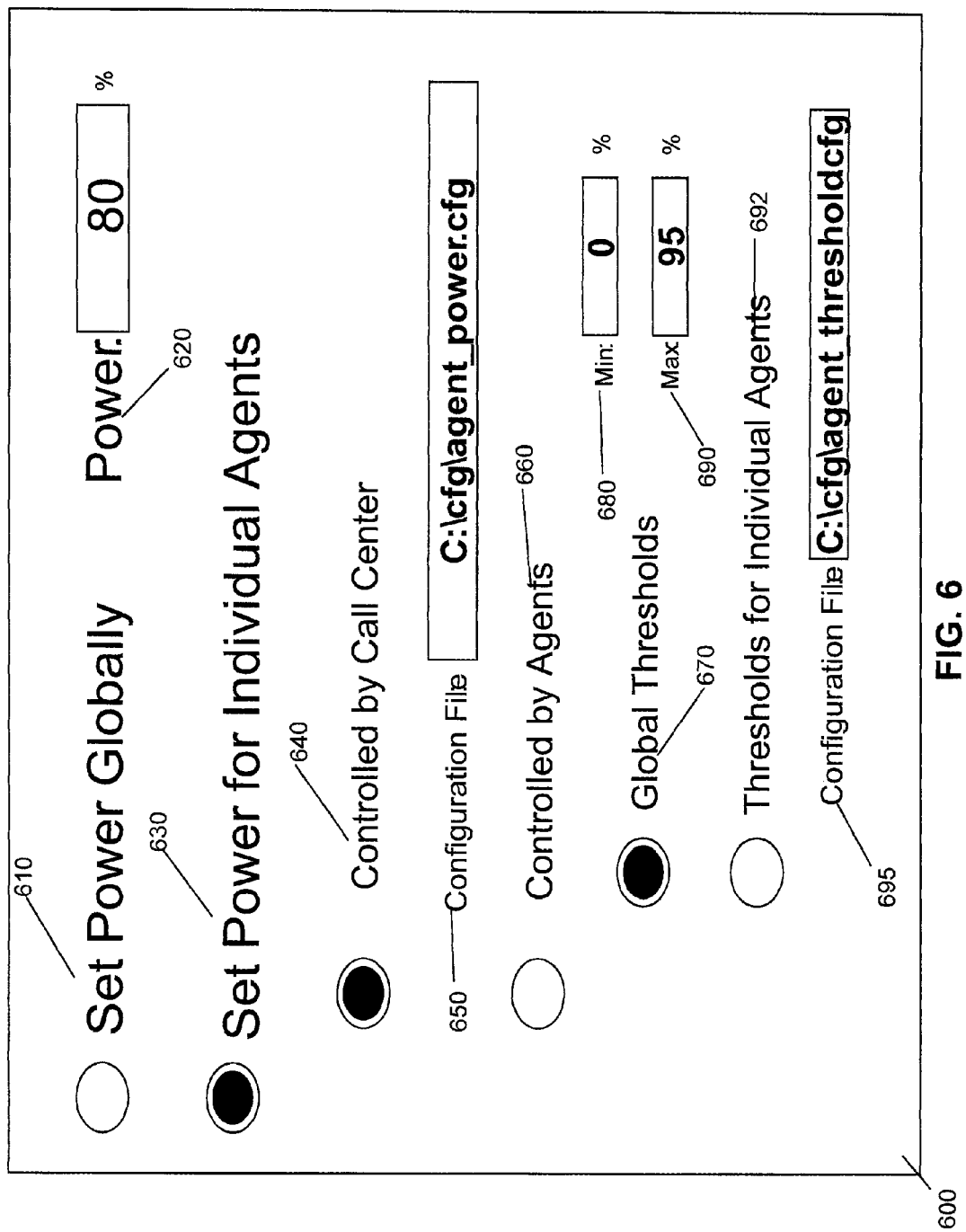
FIG. 6 illustrates an exemplary GUI (Graphical User Interface) having various graphic elements for configuring the number or fraction of callers for individual agents for routing based on performance and/or pattern matching algorithms.

In another exemplary system, the power may be set for individual agents as well as globally. FIG. 6 illustrates an exemplary GUI (Graphical User Interface) 600 having various graphic elements for configuring the power of the mapping system. Button 610 may be selected to set the power globally, while button 630 may be selected to set the power for individual agents. Note that the button is darkened when it is selected. If the power is set globally, the system administrator may then specify the global power by entering a value between 0 and 100% at entry field 620. In this particular example, however, the power is set for individual agents. Further, the power for individual agents may either be controlled by the call-center (button 640) or by the agents themselves (button 660).

If the power for individual agents is controlled by the call-center, the system administrator may then specify the path to a power configuration file at entry field 650. The configuration file may be parsed by the system and the power associated with each agent may be stored in a data structure for agent specific information. For example, for fast retrieval of the data structure for a particular agent, the agent ID may be used as a search key or index. The configuration file may have different formats. In one example, each row of the configuration file lists one agent ID and the agent's corresponding assigned power, e.g., agent_999 85. In another example, the first row of the configuration file lists a default power. With this format, those agents that are not explicitly listed in the configuration file will be assigned a default power. In yet another example, the configuration file may include a plurality of groups of agents and each group is assigned a different power.

If the power for individual agents is controlled by the agents themselves, either global thresholds (button 670) or thresholds for individual agents (button 692) may be set. If global thresholds are used, the system administrator may specify a minimum power and a maximum power at entry fields 680 and 690 respectively. Accordingly, each agent is free to adjust his/her power but the power is limited to the range between the minimum and maximum levels specified by the system administrator. Alternatively, different agents may be assigned a different set of thresholds by selecting button 692. For instance, a group of newly hired agents may be assigned a minimum threshold and a maximum threshold of 0 because the system administrator decides that there is not sufficient agent data or affinity data for the pattern matching algorithms to run effectively. With this configuration, none of the calls routed to the newly hired agents are routed based on a performance based and/or pattern matching algorithm irrespective of the powers selected by the individual agents. The system administrator may specify the path to a threshold configuration file at entry field 695. Again, the configuration file may have different formats. The system parses the configuration file according to its format and stores the thresholds assigned to each agent into a data structure for agent specific information.

It will be recognized that the various selectors, buttons, and entry fields may be adjusted in response to input from a mouse, input to a keyboard (e.g., arrow keys, numerical entries, and so on), or the like. Further, the various selectors, buttons, and entry fields may be replaced by or further include a "slider" element, drop-down selector, entry field for manually entering numbers or values, up-and-down arrows, and so on.

It will be recognized that GUI 600 may be displayed within a browser page, portal page, or standalone user interface for a contact center routing system. Additionally, various other information and functionality may be included with GUI 600, but is omitted here for clarity. For example, GUI 600 may display a report of a particular agent's performance broken down by different output/outcome variables, similar to the report of the call-center performance shown in FIG. 5. The output variables may include cost, revenue generation, customer satisfaction, first call resolution, cancellation, or other variable outputs from the pattern matching algorithm(s) or computer model(s) of the system. These output variables may be compared for callers routed to a particular agent via the mapping system and those routed otherwise. For instance, GUI 600 may include a display similar to display 510 in FIG. 5, which displays the cost over time for a particular agent with the mapping system on and off (i.e., "SatMap On" and "SatMap Off"). The displayed information may be based on past performance data or predicted values. GUI 600 may further include settings for desired weightings of different outcome variables of the pattern matching algorithms and computer models used for routing callers to a particular agent.

In some embodiments, the functionality implemented by GUI 600 may be implemented by a CLI (Command Line Interface). In general, GUI is more user-friendly because selecting icons or buttons is easier than remembering and typing command lines. However, CLI often give the user more control and options. Alternatively, a combination of GUI and CLI may be implemented and the user is given the flexibility of switching back and forth between GUI and CLI easily. In addition, the process of configuring the powers assigned to individual agents may be automated by allowing the user to write scripts.

Figure 7:
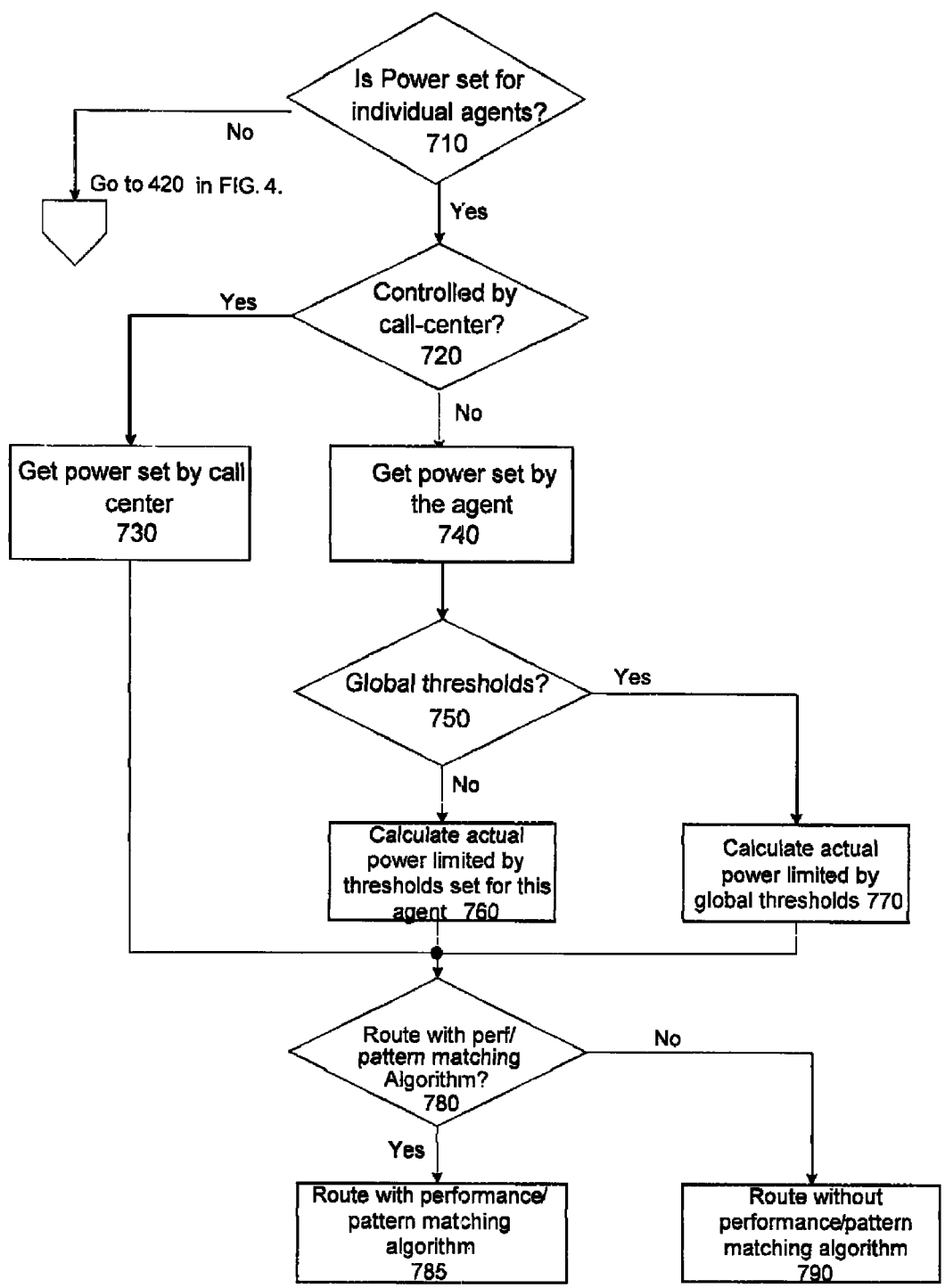
FIG. 7 illustrates an exemplary method for mapping and routing callers to a particular agent when the agent becomes available to service a caller, wherein the power may be set globally or particularly for the agent.

FIG. 7 illustrates an exemplary method for mapping and routing callers to a particular agent when the agent becomes available to service a caller, where a first portion or fraction of callers is routed to the agent based on a performance based and/or pattern matching algorithm and a second portion or fraction of callers is routed differently, e.g., based on a conventional, essentially random, routing method such as queue based routing. Note that in this example, agent-caller pair decisions are made at the time when inbound callers are held and one agent becomes available to service a caller.

The routing system determines at 710 whether the power is set for individual agents or globally. If the power is set globally, the processing may proceed to step 420 in FIG. 4. The system determines at 720 whether the power set for individual agents is controlled by the call-center or by the agents themselves. If the power is controlled by the call-center, the power set by the call-center is simply retrieved from the system at 730. For example, a value stored in a variable may be retrieved. If the power is controlled by the agents themselves, the power set by the particular agent is then retrieved from the system at 740. For example, the agent ID may be used as a key to look up the data structure for the agent specific information. The system determines at 750 whether global thresholds are used. If global thresholds are used, the power set by the particular agent is further limited by the global thresholds at 770. If thresholds for individual agents are used, the power set by the particular agent is further limited by the thresholds set for this particular agent at 760. Next, the system may determine at 780, based on the power assigned to this agent, whether the agent may be routed to the next caller with "SatMap On" or "SatMap Off." If "SatMap" is on, the agent may be routed to the next caller with performance/pattern matching algorithms at 785. If "SatMap" is off, the agent may be routed to the next caller without using any performance/pattern matching algorithms at 790.

Many of the techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Figure 8:
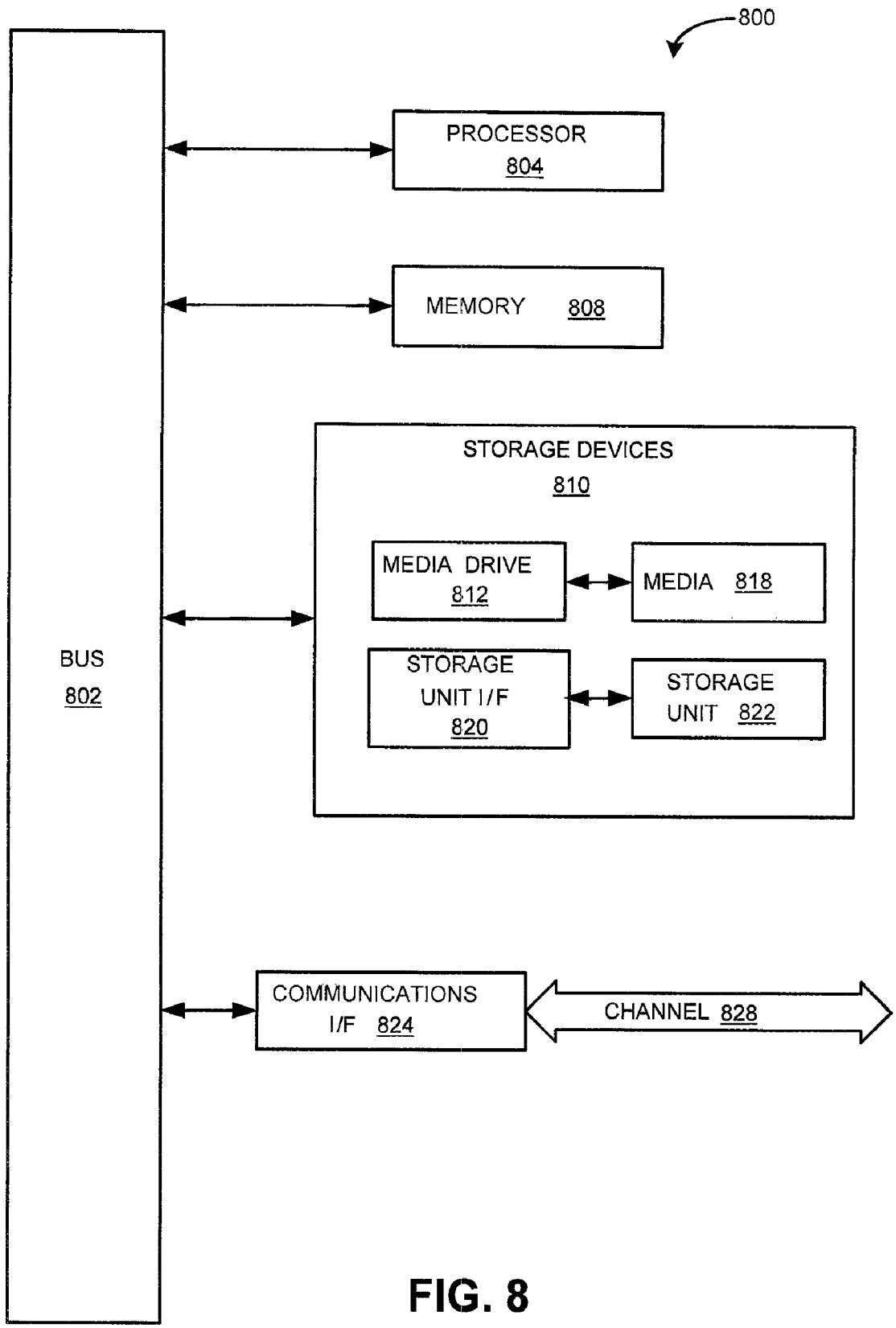
FIG. 8 illustrates a typical computing system that may be employed to implement some or all processing functionality in certain embodiments of the invention.

FIG. 8 illustrates a typical computing system 800 that may be employed to implement processing functionality in embodiments of the invention. Computing systems of this type may be used in clients and servers, for example. Those skilled in the relevant art will also recognize how to implement the invention using other computer systems or architectures. Computing system 800 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 800 can include one or more processors, such as a processor 804. Processor 804 can be implemented using a general or special purpose processing engine such as, for example, a microprocessor, microcontroller or other control logic. In this example, processor 804 is connected to a bus 802 or other communication medium.

Computing system 800 can also include a main memory 808, such as random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory ("ROM") or other static storage device coupled to bus 802 for storing static information and instructions for processor 804.

The computing system 800 may also include information storage system 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 818 may include, for example, a hard disk, floppy disk, magnetic tape, optical disk, CD or DVD, or other fixed or removable medium that is read by and written to by media drive 812. As these examples illustrate, the storage media 818 may include a computer-readable storage medium having stored therein particular computer software or data.

In alternative embodiments, information storage system 810 may include other similar components for allowing computer programs or other instructions or data to be loaded into computing system 800. Such components may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 818 to computing system 800.

Computing system 800 can also include a communications interface 824. Communications interface 84 can be used to allow software and data to be transferred between computing system 800 and external devices. Examples of communications interface 824 can include a modem, a network interface (such as an Ethernet or other NIC card), a communications port (such as for example, a USB port), a PCMCIA slot and card, etc. Software and data transferred via communications interface 824 are in the form of signals which can be electronic, electromagnetic, optical or other signals capable of being received by communications interface 824. These signals are provided to communications interface 824 via a channel 828. This channel 828 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to physical, tangible media such as, for example, memory 808, storage media 818, or storage unit 822. These and other forms of computer-readable media may be involved in storing one or more instructions for use by processor 804, to cause the processor to perform specified operations. Such instructions, generally referred to as "computer program code" (which may be grouped in the form of computer programs or other groupings), when executed, enable the computing system 800 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 800 using, for example, removable storage media 818, drive 812 or communications interface 824. The control logic (in this example, software instructions or computer program code), when executed by the processor 804, causes the processor 804 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The above-described embodiments of the present invention are merely meant to be illustrative and not limiting. Various changes and modifications may be made without departing from the invention in its broader aspects. The appended claims encompass such changes and modifications within the spirit and scope of the invention.

We claim:

1. A method for routing callers to agents in a call-center routing environment, the method comprising the acts of:
   causing a first portion of callers to be mapped to an agent of a set of agents according to a pattern matching algorithm based on comparing caller data associated with the callers and agent data associated with the agent, the first portion of callers selected based at least in part on a power variable associated with the agent, wherein the power variable represents a proportion of all callers mapped to the agent that are to be mapped to the agent using the pattern matching algorithm; and
   causing a second portion of callers to be mapped to the agent differently than the first portion, the second portion of callers selected based at least in part on the power variable associated with the agent.

2. The method of claim 1, wherein the power variable is adjustable by the call-center.

3. The method of claim 1, wherein the power variable is adjustable by the agent.

4. The method of claim 3, wherein the power variable is limited by a global minimum threshold or a global maximum threshold.

5. The method of claim 3, wherein the power variable is limited by a minimum threshold or a maximum threshold corresponding to the agent.

6. The method of claim 1, wherein the first portion of callers is further mapped to the agent based on performance based data associated with the agent.

7. The method of claim 6, wherein causing the second portion of callers to be mapped comprises mapping the callers according to a performance based order of the agents.

8. The method of claim 1, wherein causing the second portion of callers to be mapped comprises mapping the callers according to a performance based order of the agents.

9. The method of claim 1, wherein causing the second portion of callers to be mapped comprises mapping the callers to the agent based on an automatic call distribution queue order.

10. The method of claim 1, further comprising causing display of at least one outcome variable associated with the first portion of callers compared to the second portion of callers.

11. The method of claim 10, wherein the at least one outcome variable comprises one or more of cost, revenue, or customer satisfaction.

12. The method of claim 1, wherein the pattern matching algorithm comprises a neural network algorithm.

13. The method of claim 1, further comprising mapping the first portion of callers according to a computer model for predicting probable outcomes of caller-agent pairs.

14. An interface for use with a call-center routing system, the interface comprising:
   a graphical user element for adjusting one or more power variables associated with agents, the one or more power variables collectively representing a proportion of all callers mapped to the agents that are to be mapped to the agents using one or more of a performance or pattern matching algorithm, wherein the one or more power variables cause a first portion of callers to be mapped to the agents based on the one or more of a performance or pattern matching algorithm and a second portion of the callers to be mapped to the agents differently than the first portion of callers, wherein the one or more power variables are adjustable for individual agents.

15. The interface of claim 14, further comprising a graphical user element for selecting the call-center to adjust the one or more power variables for individual agents.

16. The interface of claim 14, further comprising a graphical user element for selecting the agents to adjust the one or more power variables for individual agents.

17. The interface of claim 16, further comprising a graphical user element for selecting a global threshold for the one or more power variables.

18. The interface of claim 16, further comprising a graphical user element for selecting thresholds for the one or more power variables for individual agents.

19. The interface of claim 14, wherein the second portion of callers is to be mapped to agents based on an automatic call distribution queue order.

20. The interface of claim 14, wherein causing the second portion of callers to be mapped comprises mapping the callers according to a performance based order of the agents.

21. The interface of claim 14, further comprising a display of at least one outcome variable associated with the first portion of callers compared to the second portion of callers.

22. The interface of claim 21, wherein the at least one outcome variable comprises one or more of cost, revenue, or customer satisfaction.

23. The interface of claim 14, wherein the pattern matching algorithm comprises a neural network algorithm.

24. The interface of claim 14, wherein the first portion of callers is further mapped according to a computer model for predicting probable outcomes of caller-agent pairs.

25. Apparatus for routing callers to agents in a call-center routing environment, the apparatus comprising logic for:
   causing a first portion of callers to be mapped to agents according to one or more of a performance or pattern matching algorithm based on comparing caller data associated with the callers and agent data associated with the agents, the first portion of callers selected based at least in part on one or more power variables associated with the agents, wherein the one or more power variables collectively represent a proportion of all callers mapped to the agents that are to be mapped to the agents using the one or more of a performance or pattern matching algorithm; and
   causing a second portion of callers to be mapped to agents differently than the first portion, the second portion of callers selected based at least in part on the one or more power variables associated with the agents, wherein the one or more power variables are adjustable for individual agents.

26. The apparatus of claim 25, wherein the one or more power variables are adjustable by the call-center.

27. The apparatus of claim 25, wherein the one or more power variables are adjustable by the agents.

28. The apparatus of claim 27, wherein the one or more power variables are limited by a global minimum threshold and a global maximum threshold.

29. The apparatus of claim 27, wherein a power variable of the one or more power variables is limited by a minimum threshold and a maximum threshold corresponding to a particular agent.

30. The apparatus of claim 25, further comprising logic for causing the second portion of callers to be mapped to agents based on an automatic call distribution queue order.

31. The apparatus of claim 25, wherein causing the second portion of callers to be mapped comprises mapping the callers according to a performance based order of the agents.

32. The apparatus of claim 25, further comprising logic for causing display of at least one outcome variable associated with the first portion of callers compared to the second portion of callers.

33. The apparatus of claim 25, wherein the pattern matching algorithm comprises a neural network algorithm.

34. The apparatus of claim 25, further comprising logic for mapping the first portion of callers according to a computer model for predicting probable outcomes of caller-agent pairs.

35. Computer readable storage medium comprising computer readable instructions for carrying out the method of:
    causing a first portion of callers to be mapped to agents according to one or more of a performance or pattern matching algorithm based on comparing caller data associated with the callers and agent data associated with the agents, the first portion of callers selected based at least in part on one or more power variables associated with the agents, wherein the one or more power variables collectively represent a proportion of all callers mapped to the agents that are to be mapped to the agents using the one or more of a performance or pattern matching algorithm; and
    causing a second portion of callers to be mapped to agents differently than the first portion, the second portion of callers selected based at least in part on the one or more power variables associated with the agents, wherein the one or more power variables are adjustable for individual agents.

36. The computer readable storage medium of claim 35, wherein the one or more power variables are adjustable by the call-center.

37. The computer readable storage medium of claim 35, wherein the one or more power variables are adjustable by the agents.

38. The computer readable storage medium of claim 37, wherein the one or more power variables are limited by a global minimum threshold and a global maximum threshold.

39. The computer readable storage medium of claim 37, wherein the a power variable of the one or more power variables is limited by a minimum threshold and a maximum threshold corresponding to a particular agent.

40. The computer readable storage medium of claim 35, further comprising instructions for causing the second portion of callers to be mapped based on an automatic call distribution queue order.

41. The computer readable storage medium of claim 35, wherein causing the second portion of callers to be mapped comprises mapping the callers according to a performance based order of the agents.

42. The computer readable storage medium of claim 35, further comprising instructions for causing display of at least one outcome variable associated with the first portion of callers compared to the second portion of callers.

43. The computer readable storage medium of claim 35, wherein the pattern matching algorithm comprises a neural network algorithm.

44. The computer readable storage medium of claim 35, further comprising instructions for mapping the first portion of callers according to a computer model for predicting probable outcomes of caller-agent pairs.

* * * * *